(12) United States Patent
Su et al.

(10) Patent No.: US 12,101,161 B2
(45) Date of Patent: Sep. 24, 2024

(54) METHOD OF HIGH ENERGY EFFICIENCY UNMANNED AERIAL VEHICLE (UAV) COMMUNICATION SYSTEM ASSISTED BY INTELLIGENT REFLECTING SURFACE

(71) Applicant: DALIAN UNIVERSITY OF TECHNOLOGY, Liaoning (CN)

(72) Inventors: Yuhua Su, Liaoning (CN); Nan Zhao, Liaoning (CN); Xiaowei Pang, Liaoning (CN); Xu Jiang, Liaoning (CN); Deyue Zou, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 332 days.

(21) Appl. No.: 17/790,070

(22) PCT Filed: Sep. 13, 2021

(86) PCT No.: PCT/CN2021/117881
§ 371 (c)(1),
(2) Date: Jun. 29, 2022

(87) PCT Pub. No.: WO2023/015659
PCT Pub. Date: Feb. 16, 2023

(65) Prior Publication Data
US 2023/0179285 A1 Jun. 8, 2023

(30) Foreign Application Priority Data
Aug. 12, 2021 (CN) .......................... 202110921854.3

(51) Int. Cl.
*H04B 7/145* (2006.01)
*H04B 1/04* (2006.01)
(Continued)

(52) U.S. Cl.
CPC ............ *H04B 7/145* (2013.01); *H04W 16/18* (2013.01); *H04W 16/22* (2013.01)

(58) Field of Classification Search
None
See application file for complete search history.

(56) References Cited

U.S. PATENT DOCUMENTS

| | | | |
|---|---|---|---|
| 9,793,977 B2 * | 10/2017 | Chang ................ | H04B 7/18513 |
| 10,574,338 B1 * | 2/2020 | Chang ................ | H04B 7/18504 |

(Continued)

FOREIGN PATENT DOCUMENTS

| | | |
|---|---|---|
| CN | 112332548 A | 2/2021 |
| CN | 113162679 A | 7/2021 |

(Continued)

OTHER PUBLICATIONS

Mohamed, Zina. *Leveraging UAVs with Intelligent Reflecting Surfaces for Energy-Efficient Communications with Cell-Edge Users* 2020 IEEE International Conference on Communications Workshops (ICC Workshops) Jul. 21, 2020, 6 pages.

*Primary Examiner* — Pablo N Tran
(74) *Attorney, Agent, or Firm* — MUNCY, GEISSLER, OLDS & LOWE, P.C.

(57) ABSTRACT

The present invention provides a design method of a high energy efficiency Unmanned Aerial Vehicle (UAV) communication system assisted by an intelligent reflecting surface, and belongs to the technical field of UAV communication network energy efficiency optimization. A communication process comprises two transmission links, one link is directly sent from an information source to an information sink, and the other link is reflected and transmitted by an intelligent reflecting surface attached to a UAV. The two links exist simultaneously. Based on an idea of block iteration, an original problem is decomposed into three subproblems, and a non-convex optimization problem is trans- (Continued)

formed into solvable concave-convex fractional program problems by a continuous convex approximation technique. The present invention provides a design method for joint optimization of a passive beamforming of the intelligent reflecting surface, an active beamforming of a base station and a flight trajectory of the UAV.

1 Claim, 5 Drawing Sheets

(51) Int. Cl.
*H04B 7/185* (2006.01)
*H04J 1/08* (2006.01)
*H04W 16/18* (2009.01)
*H04W 16/22* (2009.01)

(56) References Cited

U.S. PATENT DOCUMENTS

| | | |
|---|---|---|
| 11,586,227 B2 * | 2/2023 | Shattil .................... H04B 7/024 |
| 11,908,332 B2 * | 2/2024 | Faccin ................... G05D 1/101 |
| 2018/0102832 A1 * | 4/2018 | Chang ................ H04B 7/18504 |
| 2021/0126359 A1 | 4/2021 | Kim et al. |
| 2022/0256496 A1 * | 8/2022 | Srinivas ................ G01S 13/765 |
| 2022/0302968 A1 * | 9/2022 | Casey ................. H04B 7/0617 |
| 2022/0353697 A1 * | 11/2022 | Saha ...................... H04B 7/086 |

FOREIGN PATENT DOCUMENTS

| | | | |
|---|---|---|---|
| CN | 113194488 A | 7/2021 | |
| WO | WO-2020113062 A1 * | 6/2020 | ........... B64C 39/024 |

\* cited by examiner

METHOD OF HIGH ENERGY EFFICIENCY UNMANNED AERIAL VEHICLE (UAV) COMMUNICATION SYSTEM ASSISTED BY INTELLIGENT REFLECTING SURFACE

TECHNICAL FIELD

The present invention belongs to the field of energy efficiency optimization of UAV communication networks, relates to a design solution in which an Unmanned Aerial Vehicle (UAV) is combined with an intelligent reflecting surface to achieve high energy efficiency communication, and particularly relates to a method for jointly optimizing a beamforming of a sending end antenna, a phase shift matrix of the intelligent reflecting surface and a flight trajectory of the UAV during realization of communication between a sending end and a receiving end to maximize the energy efficiency of the system.

BACKGROUND

With the deployment of the $5^{th}$ generation mobile communication network and the development of intelligent mobile terminals, the demand for improving the performance of wireless communication is becoming more and more urgent. However, the existing ground communication cannot meet the whole area coverage or provide reliable transmission in some scenarios. Therefore, new communication links are constructed using Unmanned Aerial Vehicles (UAVs) and the like to assist the ground communication. UAVs have been widely used in military and civil fields due to the advantages such as low cost, easy operation and high flexibility. Compared with the ground communication, UAVs are more flexible, can be deployed quickly, and can be used to more easily establish short-range Line of Sight (LoS) links by heights thereof. In addition, due to mobility thereof, UAV trajectory optimization can be carried out to adapt to different channel conditions and ensure efficient transmission of information.

On the other hand, Intelligent Reflecting Surfaces (IRSs) has become a hot research topic for realizing the $6^{th}$ generation mobile communication (6G). An Intelligent Reflecting Surface (IRS) is a metasurface composed of a large number of passive reflecting elements, which uses a controller to adjust the resistance, capacitance, inductance, etc. of the reflecting elements to realize adjustment of the amplitude and phase of an incident signal, thus to proactively improve the wireless communication environment. In addition, the intelligent reflecting surface is passive, causing no power consumption and no self-interference during signal processing. Due to the lightweight nature thereof, the intelligent reflecting surface is easy to deploy and have a high degree of flexibility in practical implementation.

A UAV can be used as a relay in a communication system to extend transmission range. However, on the one hand, UAV relay communication will increase the delay of information transmission; on the other hand, a certain amount of energy will be consumed by the UAV as a relay for information processing, and a lot of propulsion energy will also be consumed during the movement of the UAV. Considering the limited power and endurance of the UAV, how to improve the energy efficiency of the system to achieve green communication is a key problem. Combined with various advantages of the intelligent reflecting surface, the combination of the UAV and a passive intelligent reflecting surface to assist communication can not only save energy, but also greatly improve the quality and speed of space communication. The present invention appropriately designs the parameters in the system for the purpose of maximizing energy efficiency.

SUMMARY

The purpose of the present invention is to solve the problem of energy efficiency of an Unmanned Aerial Vehicle (UAV) air-ground wireless network assisted by an intelligent reflecting surface. In a network model, the intelligent reflecting surface is attached to the UAV, and a reflection link is constructed to assist the communication between a base station and a ground user. The specific solution is shown in FIG. 1. Based on this model, the present invention provides a design method for jointly optimizing an active beamforming of the base station, a passive beamforming of the intelligent reflecting surface and a trajectory of the UAV to maximize the energy efficiency of the system.

To achieve the above purpose, the present invention adopts the following technical solution:

A design method of a high energy efficiency Unmanned Aerial Vehicle (UAV) communication system assisted by an intelligent reflecting surface, comprising the following steps:

Step 1, constructing a system model:

(1) Information transmission between a base station and a ground user is realized, wherein the base station comprises multiple antennas, and the user comprises a single antenna; in a three-dimensional coordinate system, horizontal coordinates of the fixed base station and the user are respectively $q_B=[x_B,y_B]$ and $q_G=[x_G,y_G]$, and an height of base station antennas is set as $z_B$.

(2) It is assumed that a UAV flies at a fixed height h with a flight time of T which is discretized into N time slots with a time slot length of $\delta_t=T/N$, then the horizontal coordinate of the UAV in the $n^{th}$ time slot is $q[n]=[x[n], y[n]]^T$, $n \in N=\{0, \ldots, N\}$, and the UAV flies from an initial position $q_0$ to a final position $q_F$, i.e., $q[0]=q_0$, $q[N]=q_F$.

(3) It is assumed that a channel between the base station and the user is blocked and a serious fading exists, which conforms to Rayleigh fading, then a channel gain from the base station to the user is:

$$h_{BG}=\sqrt{\rho d_{BG}^{-\kappa}} \tilde{h} \in \mathbb{C}^{1 \times N_t}, \quad (1)$$

Where $\rho$ is a channel gain at a unit reference distance, $d_{BG}=\sqrt{z_B^2+\|q_B-q_G\|^2}$ is a distance between the base station and the ground user, $\kappa$ is a path loss index, $\tilde{h} \sim CN(0,1)$ is a channel gain of a Rayleigh channel, and $N_t$ is the number of antennas on the base station.

As the UAV has a certain height, the two reflection links from the base station to the intelligent reflecting surface and from the intelligent reflecting surface to the user are both Line of Sight (LoS) links, then the channel gain from the base station to the intelligent reflecting surface can be expressed as:

$$h_{BI}[n]=\sqrt{\rho d_{BI}^{-2}[n]} h_M^T(\alpha[n]) h_{N_t}(\beta[n]) \in \mathbb{C}^{M \times N_t}, \quad (2)$$

Where $d_{BI}[n]=\sqrt{(z_1-z_B)^2+\|q[n]-q_B\|^2}$ represents a distance between the base station and the intelligent reflecting surface, $h_M^T$ is a transposition matrix of $h_M$, M reflecting elements on the intelligent reflecting surface are arranged in the form of a Uniform Linear Array (ULA), position coordinates of the first reflecting element (i.e., the UAV) are used to determine a reference point, then array responses of the intelligent reflecting surface and the base station can be expressed as $$h_M^T(\alpha[n]) = \left(1, e^{-j\frac{2\pi}{\lambda}d\alpha[n]}, \ldots, e^{-j\frac{2\pi}{\lambda}d(M-1)\alpha[n]}\right)^T \text{ and}$$

$$h_{N_t}(\beta[n]) = \left(1, e^{-j\frac{2\pi}{\lambda}d\beta[n]}, \ldots, e^{-j\frac{2\pi}{\lambda}d(N_t-1)\beta[n]}\right),$$

where j represents an imaginary part, d is a horizontal distance between different reflecting elements, λ is a wavelength of a carrier, $$\alpha[n] = \frac{y_I - y_B}{d_{BI}[n]}$$

is the cosine of arrival angle of a signal from the base station to the intelligent reflecting surface, and $$\beta[n] = \frac{z_I - z_B}{d_{BI}[n]}$$

is the cosine of departure angle of the signal from the base station to the intelligent reflecting surface, where $y_I$ and $y_B$ are respectively y-axis coordinates corresponding to the intelligent reflecting surface and the base station in the three-dimensional coordinate system, and $z_I$ is a height of the intelligent reflecting surface, which is the same as the flight height of the UAV in this study.

A channel from the intelligent reflecting surface to the ground user is also a Line of Sight (LoS) link, and a gain thereof can be expressed as:

$$h_{IG}[n] = \sqrt{\rho d_{IG}^{-2}[n]}\left(1, e^{-j\frac{2\pi}{\lambda}d\phi[n]}, \ldots, e^{-j\frac{2\pi}{\lambda}d(M-1)\phi[n]}\right)^T \in \mathbb{C}^{M\times 1}, \quad (3)$$

Where $d_{IG}[n] = \sqrt{z_I^2 + \|q[n] - q_G\|^2}$ represents a distance between the intelligent reflecting surface and the user, and $$\phi[n] = \frac{y_G - y_I}{d_{IG}[n]}$$

is the cosine of departure angle of the signal reflected from the intelligent reflecting surface to the user, where $y_G$ and $y_I$ are respectively y-axis coordinates corresponding to the user and the intelligent reflecting surface in the three-dimensional coordinate system.

Phase shift adjustment of the signal on the intelligent reflecting surface can be expressed as $\Theta[n] = \text{diag}(e^{j\theta_1[n]}, e^{j\theta_2[n]}, \ldots, e^{j\theta_M[n]})$, where diag represents a diagonal matrix, $\theta_M[n]$ is a phase shift value of the $M^{th}$ reflecting element in the $n^{th}$ time slot, and $\theta \in [0, 2\pi]$ assuming that the phase can be continuously controlled and adjusted.

(4) A Signal-Noise-Ratio (SNR) of the system is a function of a beamforming w of the base station, a phase shift matrix $\Theta$ of the intelligent reflecting surface, and a flight trajectory $Q \triangleq \{q[n], n \in \mathcal{N}\}$ of the UAV. An average achievable rate can be expressed as:

$$\overline{R}(\{w\}, \{\Theta\}, \{Q\}) = \frac{1}{N}\sum_{n=1}^{N}\log_2(1 + SNR[n]) = \quad (4)$$

$$\frac{1}{N}\sum_{n=1}^{N}\log_2\left(1 + \frac{F\left|\left(h_{BG} + h_{IG}^H[n]\Theta[n]h_{BI}[n]\right)w[n]\right|^2}{\sigma^2}\right).$$

Where SNR[n] is the SNR in the $n^{th}$ time slot, $\delta^2$ is a noise power, P is a transmitting power of the base station, and w[n] represents the beamforming of the base station in the $n^{th}$ time slot. During the flight time T of the UAV, the total amount of data transmitted by the system is $R^{total}(\{w\}, \{\Theta\}, \{Q\}) = WN\delta_t\overline{R}$, where W is the bandwidth of the system.

Energy consumption of the system is mainly used to conduct communication and guarantee the hovering and propulsion of the UAV, of which the former is very low compared with the latter, and is so ignored. A propulsion power of the UAV is related to a flight velocity, an acceleration and a design of the UAV as well as air density, and energy consumed by the UAV during the flight time can be expressed as:

$$E^{total}(\{v\}, \{a\}) = \quad (5)$$

$$\delta_t \sum_{n=1}^{N}\left[c_1\|v[n]\|^3 + \frac{c_2}{\|v[n]\|}\left(1 + \frac{\|a[n]\|^2 - \frac{(a^T[n]v[n])^2}{\|v[n]\|^2}}{g^2}\right)\right] +$$

$$\frac{1}{2}m\left(\|v[N]\|^2 - \|v[0]\|^2\right).$$

Where $c_1$ and $c_2$ are two parameters, which are related to the design of the UAV and the air density, g is the gravitational acceleration, v[n] and a[n] are respectively the velocity and the acceleration of the UAV in the $n^{th}$ time slot, and m is the weight of the UAV and the intelligent reflecting surface.

Energy efficiency refers to amount of information transmitted per unit energy consumption; according to the definition thereof, the energy efficiency of the system can be expressed as:

$$EE(\{w\}, \{\Theta\}, \{Q\}, \{v\}, \{a\}) = \frac{R^{total}(\{w\}, \{\Theta\}, \{Q\})}{E^{total}(\{v\}, \{a\})}. \quad (6)$$

Step 2, determining an objective function and optimization variables, and listing an optimization problem:

Through joint optimization of an active beamforming w of the base station, a passive beamforming $\Theta$ of the intelligent reflecting surface and the trajectory Q of the UAV, the energy efficiency of the system is maximized, and the following optimization problem is constructed:

$$(P1): \max_{w,\Theta,Q,v,a} EE(\{w\}, \{\Theta\}, \{Q\}, \{v\}, \{a\}) = \frac{R^{total}(\{w\}, \{\Theta\}, \{Q\})}{E^{total}(\{v\}, \{a\})} \quad (7)$$

s.t. $C1: v[0] = v_0$, $C2: v[N] = v_F$, $C3: v[n] = v[n-1] + a[n]\delta_t, n \in N$, $C4: \|v[n]\| \leq v_{max}, n \in N$, -continued $C5: \|v[n]\| \geq v_{min}, n \in N,$ $C6: \|a[n]\| \leq a_{max}, n \in N,$ $C7: q[n] = q[n-1] + v[n]\delta_t + \frac{1}{2}a[n]\delta_t^2, n \in N,$ $C8: q[N] = q_F,$ $C9: q[0] = q_0.$ In this optimization problem, C1-C6 are constraints on the velocity and the acceleration of the UAV, where $v_0$ and $v_F$ are respectively an initial velocity and a terminal velocity, and $v_{max}$, $v_{min}$ and $a_{max}$ are respectively the maximum flight velocity, the minimum flight velocity and the maximum flight acceleration of a fixed-wing UAV. C7 and C8 are constraints on the trajectory of the UAV.

Step 3, designing an algorithm to solve the optimization problem:

Analysis shows that the above optimization problem is a non-convex optimization problem and cannot be solved directly, therefore an idea of block iteration is used to decompose the problem into three sub-problems, a closed-form expression of optimal solutions for the beamformings of the base station and the intelligent reflecting surface is obtained, and the trajectory of the UAV is optimized; firstly, a successive convex approximation method is used to transform the non-convex problem into a convex optimization problem, then a Dinkelbach algorithm is used to solve a fractional program problem, and an iterative algorithm is designed to obtain a suboptimal solution thereof. The specific steps are as follows:

(1) Optimization of the Active Beamforming w of the Base Station

It is considered that the signal emitted from the base station is divided into two parts: one part is directly transmitted to the ground and the other part is transmitted to the intelligent reflecting surface. When the beamforming $\Theta$ of the intelligent reflecting surface and the trajectory Q of the UAV are determined, the energy consumed is also determined, and it is only needed to analyze the numerator of the objective function to maximize the achievable rate. A closed-form solution of an optimal beamforming of the base station when the other two variables $\Theta$ and Q are determined can be obtained by Maximum Ratio Transmission (MRT), i.e.:

$$W^*[n] = \frac{\left(h_{BG} + h_{IG}^H[n]\Theta[n]h_{BI}[n]\right)^H}{\left\|h_{BG} + h_G^H[n]\Theta[n]h_{BI}[n]\right\|}. \tag{8}$$

(2) Optimization of the Passive Beamforming $\Theta$ of the Intelligent Reflecting Surface The optimal beamforming $w^*[n]$ of the base station is substituted into the objective function, and the numerator of the objective function can be simplified as:

$$R^{total'}(\Theta), \{Q\}) = \tag{9}$$

$$W\delta_t \bar{R}_1 = \frac{1}{N}\sum_{n=1}^{N}\log_2\left(1 + \frac{P}{\sigma^2}\left\|h_{BG} + h_{IG}^H[n]\Theta[n]h_{BI}[n]\right\|^2\right).$$

When the trajectory Q of the UAV is determined, the numerator of the objective function is determined, and it is only needed to analyze formula (9) to obtain an optimal $\Theta$. The variable $\|h_{BG}+h_{IG}^H[n]\Theta[n]h_{BI}[n]\|^2$ in formula (9) is analyzed as follows:

$$\|h_{BG} + h_{IG}^H[n]\Theta[n]h_{BI}[n]\|^2 = \left(h_{BG} + h_{IG}^H[n]\Theta[n]h_{BI}[n]\right) \tag{10}$$

$$\left(h_{BG}^H + h_{BI}^H[n]\Theta^H[n]h_{IG}[n]\right)$$

$$= h_{BG}h_{BG}^H + \underbrace{2\text{Re}\{h_{IG}^H[n]\Theta[n]h_{BI}[n]h_{BG}^H\}}_{\Phi_1[n]} +$$

$$\underbrace{\|h_{IG}^H[n]\Theta[n]h_{BI}[n]\|^2}_{\Phi_2[n]}.$$

Where $\text{Re}\{\cdot\}$ represents a real part of a negative number, and $\Phi_1$ and $\Phi_2$ are quantities associated with the reflecting elements of the intelligent reflecting surface.

Further analysis shows that:

$$\Phi_1[n] = \rho d_{BG}^{-\frac{\kappa}{2}}d_{BI}^{-1}[n]\cdot 2\text{Re}\underbrace{\{h_{IG}^H[n]\Theta[n]h_M^T(\alpha[n])h_{N_t}(\beta[n])\tilde{h}^H\}}_{\Phi_I'[n]}. \tag{11}$$

$$\Phi_I'[n] = \sqrt{\rho d_{IG}[n]}\left[e^{j\theta_1}, e^{j\left(\frac{2\pi}{\lambda}d\phi[n]+\theta_2\right)}, \ldots, e^{j\left(\frac{2\pi}{\lambda}d(M-1)\phi[n]+\theta_M\right)}\right]. \tag{12}$$

$$\left[1, e^{-j\frac{2\pi}{\lambda}d\alpha[n]}, \ldots, e^{-j\frac{2\pi}{\lambda}d(M-1)\alpha[n]}\right]^T \cdot h_{N_t}(\beta[n])\tilde{h}^H$$

$$= \sqrt{\rho d_{IG}[n]}\left(\sum_{m=1}^{M}e^{j\left(\frac{2\pi}{\lambda}d(m-1)(\phi[n]-\alpha[n])+\theta_m[n]\right)}\right).$$

$$h_{N_t}(\beta[n])\tilde{h}^H.$$

When the trajectory of the UAV is determined, a phase adjustment value corresponding to the real part of maximized $\Phi_1'$ can be obtained, i.e.:

$$\theta_m^{1*}[n] = -\frac{2\pi}{\lambda}d(m-1)(\phi[n]-\alpha[n]) - \arg\left(h_{N_t}(\beta[n])\tilde{h}^H\right). \tag{13}$$

Where $\arg(\cdot)$ represents an explement of a complex number, m represents the $m^{th}$ reflecting element, and $\tilde{h}^H$ represents a conjugate transpose of $\tilde{h}$.

Next, $\Phi_2$ is analyzed, and it can be deduced that:

$$\Phi_2[n] = \rho N_t d_{BI}^{-2}[n]\cdot\left(h_{IG}^H[n]\Theta[n]h_M^T[n]\right)\left(h_{IG}^H[n]\Theta[n]h_M^T[n]\right)^H \tag{14}$$

$$= \rho^2 N_t d_{BI}^{-2}[n]d_{IG}^{-2}[n]\cdot$$

$$\left|\sum_{m=1}^{M}e^{j\left(\frac{2\pi}{\lambda}d(m-1)(\phi[n]\alpha[n])+\theta_m\right)}\right|^2.$$

When the trajectory of the UAV is determined, a phase adjustment value corresponding to the maximized $\Phi_2$ can be obtained, i.e.:

$$\theta_1^{2*}[n] = \tag{15}$$

$$\theta_2^{2*}[n] + \frac{2\pi}{\lambda}d(\phi[n]-\alpha[n]) = \ldots = \theta_m^{2*}[n] + \frac{2\pi}{\lambda}d(m-1)(\phi[n]-\alpha[n]).$$

By substituting formula (15) into formula (13), it can be found that $\Phi_1$ and $\Phi_2$ can reach the maximum values at the same time, and an optimal reflection phase is obtained, i.e:

$$\theta_m^*[n] = -\frac{2\pi}{\lambda}d(m-1)(\phi[n]-\alpha[n]) - \arg\left(h_{N_t}(\beta[n])\widetilde{h}^H\right). \quad (16)$$

An optimal passive beamforming of the intelligent reflecting surface can be expressed as:

$$\Theta^*[n] = \text{diag}(e^{j\theta_1^*[n]}, e^{j\theta_2^*[n]}, \ldots, e^{j\theta_M^*[n]}). \quad (17)$$

(3) Optimization of the Trajectory Q of the UAV

The optimal passive beamforming $\Theta$ of the intelligent reflecting surface is substituted into the objective function, and the objective function can be simplified as:

$$EE'(\{Q\},\{v\},\{a\}) = \tag{18}$$

$$\frac{W\sum_{n=1}^{N}\log_2\left[1+\frac{P}{\sigma^2}\left(C+\frac{A}{d_{IG}[n]d_{BI}[n]}+\frac{B}{d_{IG}^2[n]d_{BI}^2[n]}\right)\right]}{\sum_{n=1}^{N}\left[c_1\|v[n]\|^3 + \frac{c_2}{\|v[n]\|}\left[1+\frac{\|a[n]\|^2 - \frac{(a^T[n]v[n])^2}{\|v[n]\|^2}}{g^2}\right]\right] + \frac{1}{2}m(\|v[N]\|^2 - \|v[0]\|^2)}$$

Where $A = 2\rho^{\frac{3}{2}}d_{BG}^{-\frac{K}{2}}M\left|h_{N_t}[n](\alpha[n])\widetilde{h}^H\right|$, $B = \rho^2 N_t M^2$ and $C = \rho d_{BG}^{-K}\widetilde{h}\widetilde{h}^H$.

It is assumed that the initial velocity and the final velocity of the UAV are the same, i.e., $\|v[0]\| = \|v[N]\|$ and $\|\cdot\|$ and represents a 2-norm, then in the expression of energy consumption, the change of the second item kinetic energy is zero. The upper bound of energy consumption can be expressed as:

$$E(\{v\},\{a\}) \leq E_{ub}(\{v\},\{a\}) = \sum_{n=1}^{N}\left[c_1\|v[n]\|^3 + \frac{c_2}{\|v[n]\|}\left(1+\frac{\|a[n]\|^2}{g^2}\right)\right], \quad (19)$$

When $a^T[n]v[n]=0$, equality can be achieved. Therefore, the lower bound of energy efficiency can be expressed as:

$$EE'_{lb}(\{Q\},\{v\},\{a\}) = \tag{20}$$

$$\frac{W\sum_{n=1}^{N}\log_2\left[1+\frac{P}{\sigma^2}\left(C+\frac{A}{d_{IG}[n]d_{BI}[n]}+\frac{B}{d_{IG}^2[n]d_{BI}^2[n]}\right)\right]}{\sum_{n=1}^{N}\left[c_1\|v[n]\|^3 + \frac{c_2}{\|v[n]\|}\left(1+\frac{\|a[n]\|^2}{g^2}\right)\right]}.$$

As the objective function is a non-convex fractional program problem, auxiliary variables $\{r[n]=d_{IG}[n]\}$, $\{s[n]=d_{BI}[n]\}$ and $\{\tau_n=\|v[n]\|\}$ are introduced, and the non-convex problem can be transformed into concave-convex fractional program problems:

$$(P2): \max_{Q,v,a} \frac{W\sum_{n=1}^{N}\log_2\left[1+\frac{P}{\sigma^2}\left(C+\frac{A}{r[n]s[n]}+\frac{B}{r^2[n]s^2[n]}\right)\right]}{\sum_{n=1}^{N}\left[c_1\|v[n]\|^3 + \frac{c_2}{\tau_n} + \frac{c_2\|a[n]\|^2}{\tau_n g^2}\right]} \quad (21a)$$

s.t. $\tau_n \geq v_{min}, n \in N,$ (21b)

$\|v[n]\|^2 \geq \tau_n^2, n \in N,$ (21c)

$\|v_0(n)\|^2 + 2v_0^T[n](v[n]-v_0[n]) \geq \tau^2, n \in N,$ (21d)

$d_{IG}^2[n] + r_0^2[n] - 2r_0[n]r[n] \leq 0, n \in N,$ (21e)

$d_{BI}^2[n] + s_0^2[n] - 2s_0[n]s[n] \leq 0, n \in N,$ (21f)

(21g)

Where inequations (21b)-(21d) have optimal solutions when equality is achieved; if no equality is achieved, a larger objective function value can be obtained by increasing r[n], s[n] or $\tau_n$ constantly; therefore, the optimal solution of the original problem remains unchanged after the introduction of the auxiliary variables. The above problems are concave-convex fractional program problems with convex constraints, the Dinkelbach algorithm is used to introduce a parametric variable μ, and convex optimization kit CVX can be used to solve the following problems:

$$(P3): \max_{Q,v,a} W\sum_{n=1}^{N}\log_2\left[1+\frac{P}{\sigma^2}\left(C+\frac{A}{r[n]s[n]}+\frac{B}{r^2[n]s^2[n]}\right)\right] - \quad (22a)$$

$$\mu\sum_{n=1}^{N}\left[c_1\|v[n]\|^3 + \frac{c_2}{\tau_n} + \frac{c_2\|a[n]\|^2}{\tau_n g^2}\right]$$

s.t. $(21b) - (21g).$ (22b)

(4) Design of the Iterative Algorithm

The present invention proposes an iterative algorithm to solve the optimization problem; in each round of iteration, the Dinkelbach algorithm is used to solve an optimal flight trajectory of the UAV in the current round of iteration, and then the optimal passive beamforming of the intelligent reflecting surface and active beamforming of the base station antennas are calculated, thus to solve the energy efficiency value of the iteration. Then the value of the parametric variable is updated for a next iteration until the algorithm is converged at last. The specific process is as follows:

1) Setting initial beamforming $w_0$ of the base station, reflection phase $\Theta_0$ of the intelligent reflecting surface, flight trajectory $Q_0$ of the UAV, flight velocity $v_0$ of the UAV, and auxiliary variables $r_0$ and $s_0$; iteration number k=0; initial value $\mu_0=1$ of the parametric variable introduced by the Dinkelbach algorithm; and iteration termination threshold $\xi$.

2) Solving the convex optimization problem (P3) to obtain optimization results of the $k^{th}$ iteration, i.e., flight trajectory $Q_{k+1}$ of the UAV, flight velocity $v_{k+1}$ of the UAV and auxiliary variables $r_{k+1}$ and $s_{k+1}$, which are used as the initial values of the $(k+1)^{th}$ iteration.

3) Updating the value of the parametric variable $\mu_{k+1}$, which is the value of the objective function in problem (P2).

4) After the optimized trajectory $Q_{k+1}$ of the iteration is obtained, calculating an optimal reflection phase $\theta_{k+1}$ of the intelligent reflecting surface by formula (16) and formula (17).

5) After $Q_{k+1}$ and $\Theta_{k+1}$ are obtained, using formula (8) to calculate the optimal beamforming $w_{k+1}$ of the base station corresponding to the iteration.
6) Calculating an increment in a target value EE of problem (P2) after the iteration; if the increment is greater than the threshold, updating the number of iterations k=k+1, and skipping to step 2) for a next iteration optimization; if the increment of the target value of the optimization is less than the threshold, terminating the iteration, and outputting values of corresponding optimization variables.

The present invention has the following beneficial effects: through joint optimization design of an active beamforming of the base station antennas, a passive beamforming of the intelligent reflecting surface and the trajectory of the UAV, the present invention provides a deployment solution for maximizing energy efficiency in a process of information transmission. The invention provides a reference value method for realizing UAV-assisted green communication.

DETAILED DESCRIPTION

To better understand the above technical solutions, a detailed analysis is made below in combination with drawings and specific implementation.

A design method of a high energy efficiency Unmanned Aerial Vehicle (UAV) communication system assisted by an intelligent reflecting surface, comprising the following steps:

Step 1, performing the following specific settings:

(1) The horizontal coordinates of the base station and the ground user are $q_B=[0,0]$ m and $q_G=[0,400]$ m respectively, the height of the base station is 20 m, the flight height of the UAV is 120 m, and the horizontal coordinates of the initial point and the final point are $q_0=[-200, 0]$ m and $q_F=[200,400]$ m respectively. The channel bandwidth is W=1 MHz, the transmission power of the base station is P=20 dBm, path loss index of from the base station to the user is κ=4, the channel gain at the reference point is ρ=−30 dB, and the noise power is $\sigma^2=-110$ dBm.

(2) Other parameter settings related to the flight of the UAV are that: the time slot of the flight is $\delta_t=0.5$ s, the maximum flight velocity of the UAV is $v_{max}=100$ m/s, the minimum velocity is $v_{min}=3$ m/s, and the maximum acceleration is $a_{max}=5$ m/s²; for the parameters in formula (5), $c_1=9.26\times10^{-4}$ and $c_2=2250$.

Figure 1:
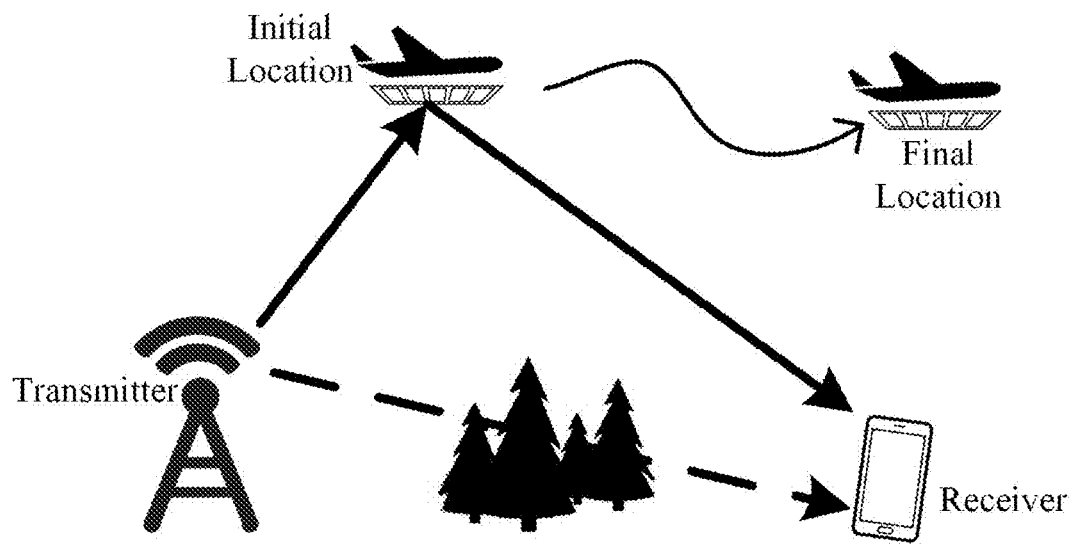
FIG. 1 is a schematic diagram of a UAV communication network assisted by an intelligent reflecting surface.
Figure 2:
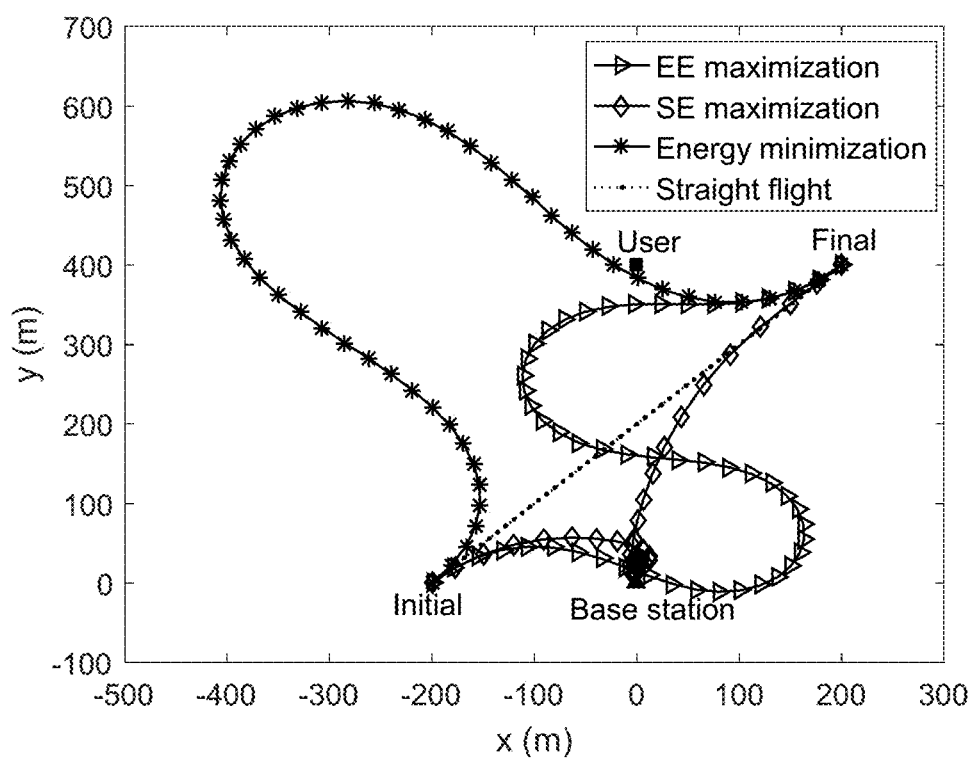
FIG. 2 shows comparison of trajectories of a UAV in different optimization solutions with a flight time of 50 s.
Figure 3:
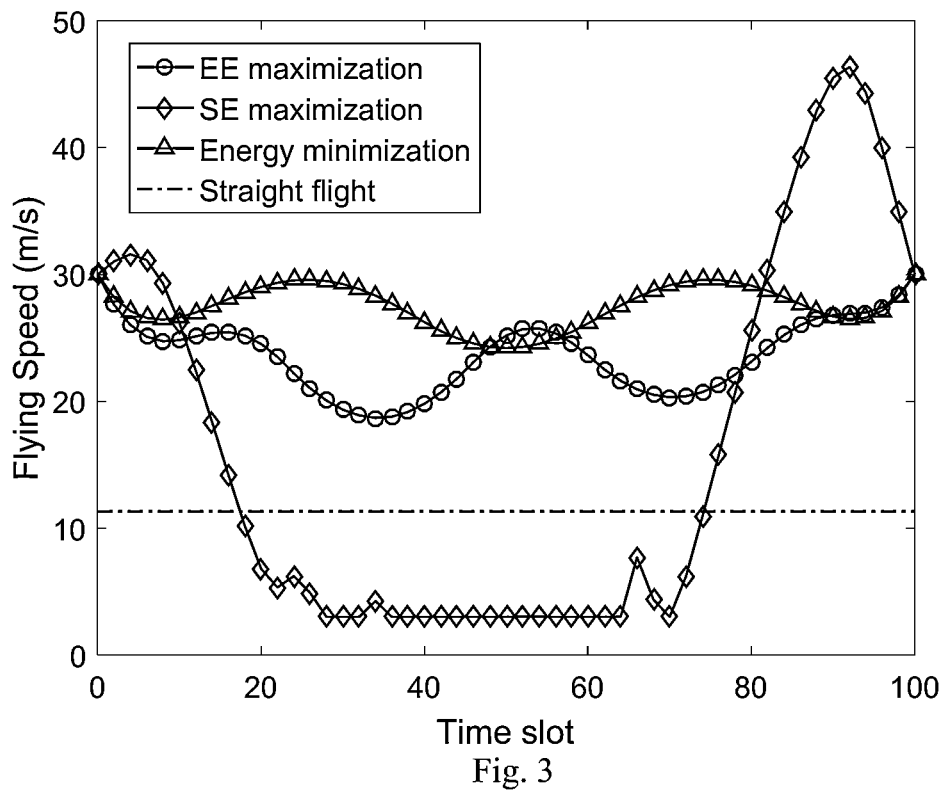
FIG. 3 shows comparison of velocity changes of a UAV in different optimization solutions with a flight time of 50 s.

Step 2, analyzing the trajectory and the velocity of the UAV under different optimization solutions:

Optimization of energy efficiency is a fractional program problem, which requires a balance between increasing the achievable rate and reducing the energy consumption. FIG. 2 and FIG. 3 respectively show the flight trajectories and velocity changes of the UAV under three optimization solutions. Comparison shows that, when only the maximum achievable rate is guaranteed, the UAV will slow down to an optimal position, then fly around the position at the lowest velocity, and finally accelerate and fly to a final position. When only the minimum energy consumption is guaranteed, the UAV will maintain a relatively high velocity to minimize energy consumption, reduce the number of turns and expand the turning radius. However, neither of the above two flight trajectories can achieve a relatively high energy efficiency. When the energy efficiency is the maximum, the flight trajectories of the UAV are S-shaped, the UAV conducts a level flight between the base station and the user, the average velocity slightly is lower than that corresponding to the minimum energy consumption, and the velocity change throughout the flight is not large.

Figure 4:
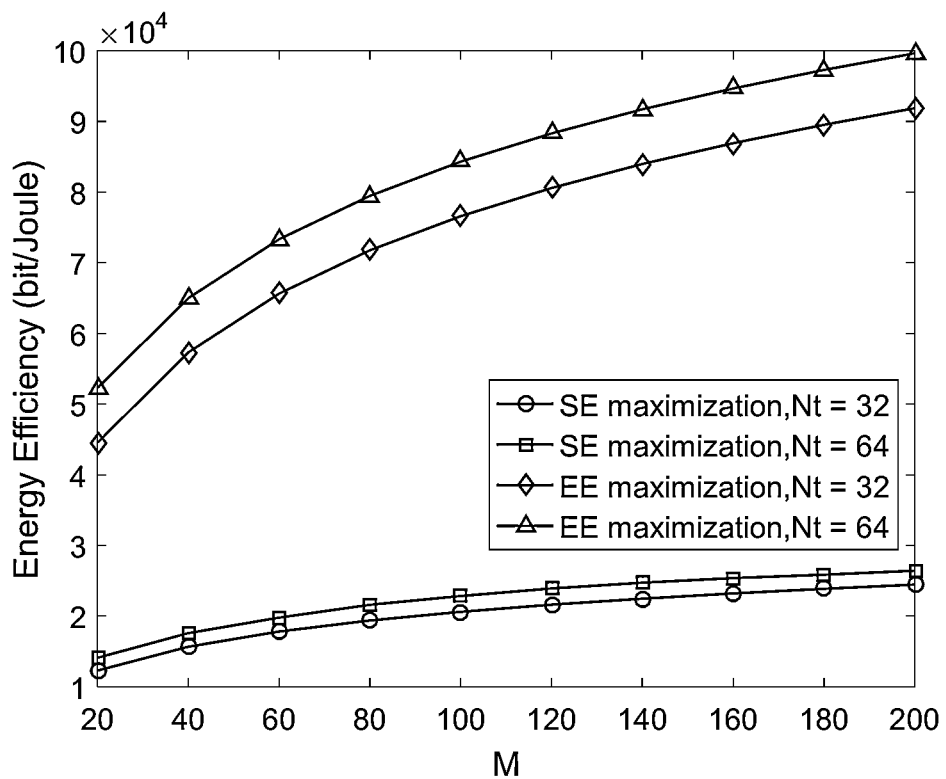
FIG. 4 shows influence of number of reflecting elements on an intelligent reflecting surface and number of base station antennas on energy efficiency of two optimization solutions.

Step 3, comparing and analyzing the number of elements on the intelligent reflecting surface and the number of the base station antennas under the two optimization solutions:

FIG. 4 analyzes the energy efficiency values changing with the number of the reflecting elements on the intelligent reflecting surface under the energy efficiency maximization solution (solution 1) and the spectrum efficiency maximization (solution 2) when the numbers of the base station antennas are 32 and 64. First, the energy efficiency value is increased with the increase of M, and when the number of the base station antennas is increased, the energy efficiency is also increased, therefore the energy efficiency can be improved by arranging multiple reflecting elements and base station antennas. In addition, the energy efficiency of solution 1 is much higher than that of solution 2, which proves the necessity of energy efficiency optimization.

Figure 5:
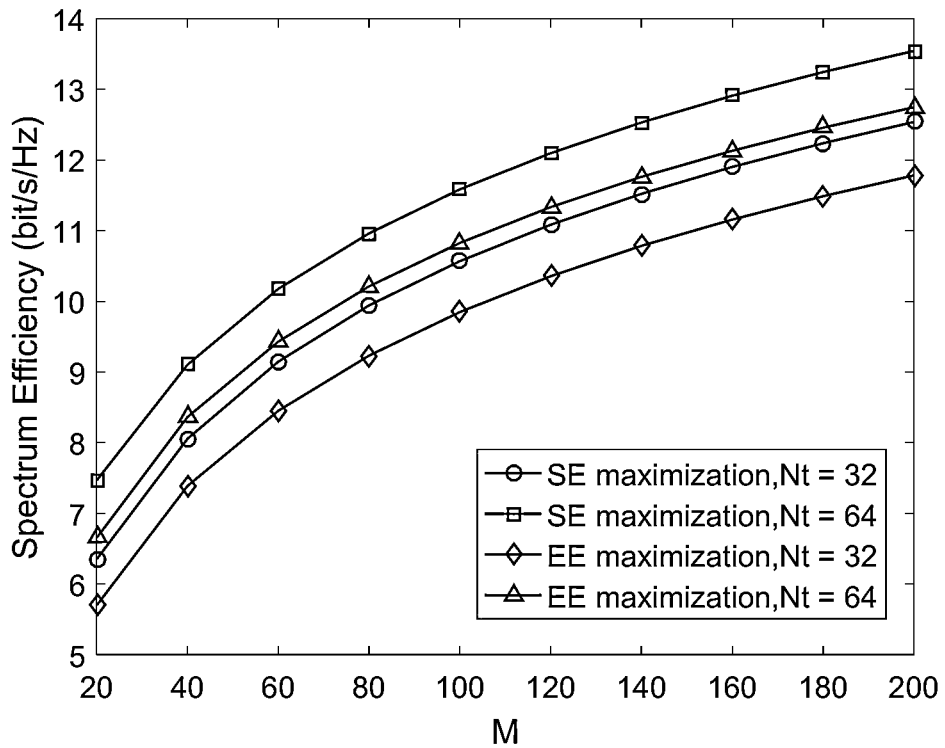
FIG. 5 shows influence of number of reflecting elements on an intelligent reflecting surface and number of base station antennas on spectrum efficiency of two optimization solutions.
Figure 6A:
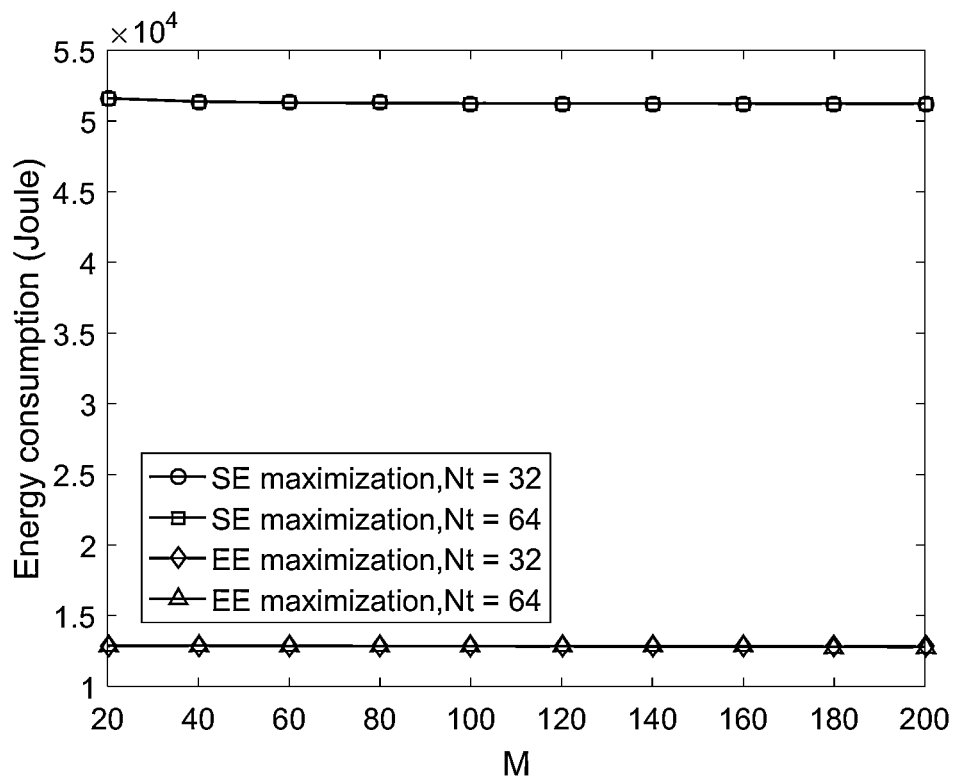
FIG. 6(a) shows influence of number of reflecting elements on an intelligent reflecting surface and number of base station antennas on energy consumption of two optimization solutions.
Figure 6B:
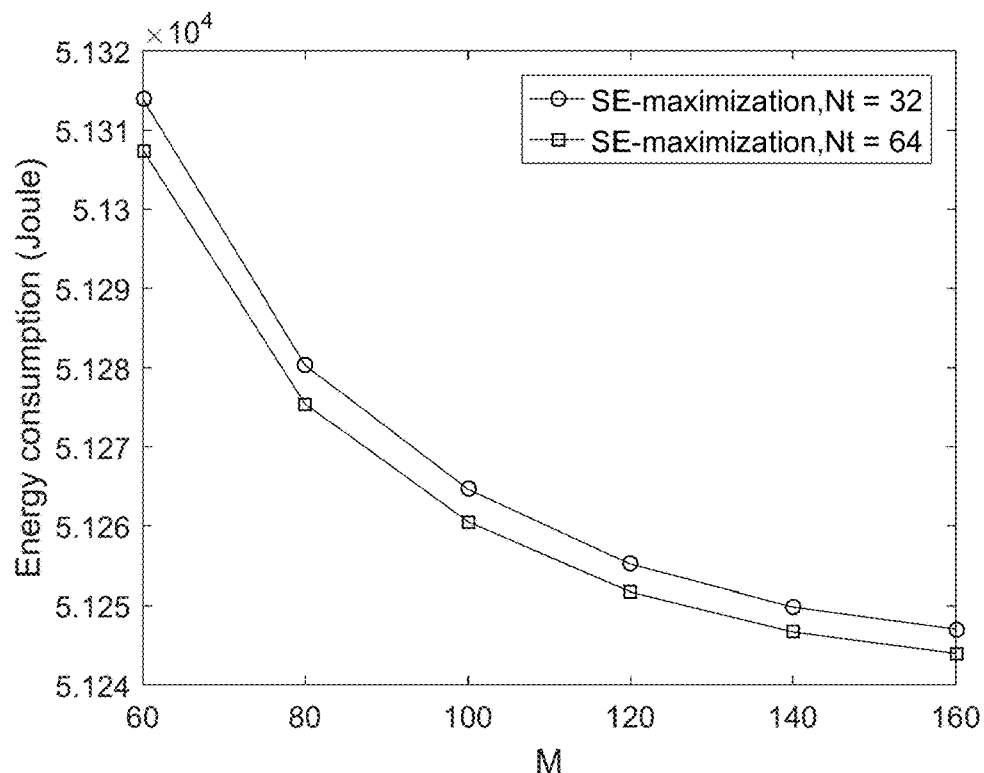
FIG. 6(b) is a partial enlarged view when number of elements on an intelligent reflecting surface is 60 to 160 under an optimization solution of maximizing spectrum efficiency as shown in FIG. 6(a)
Figure 6C:
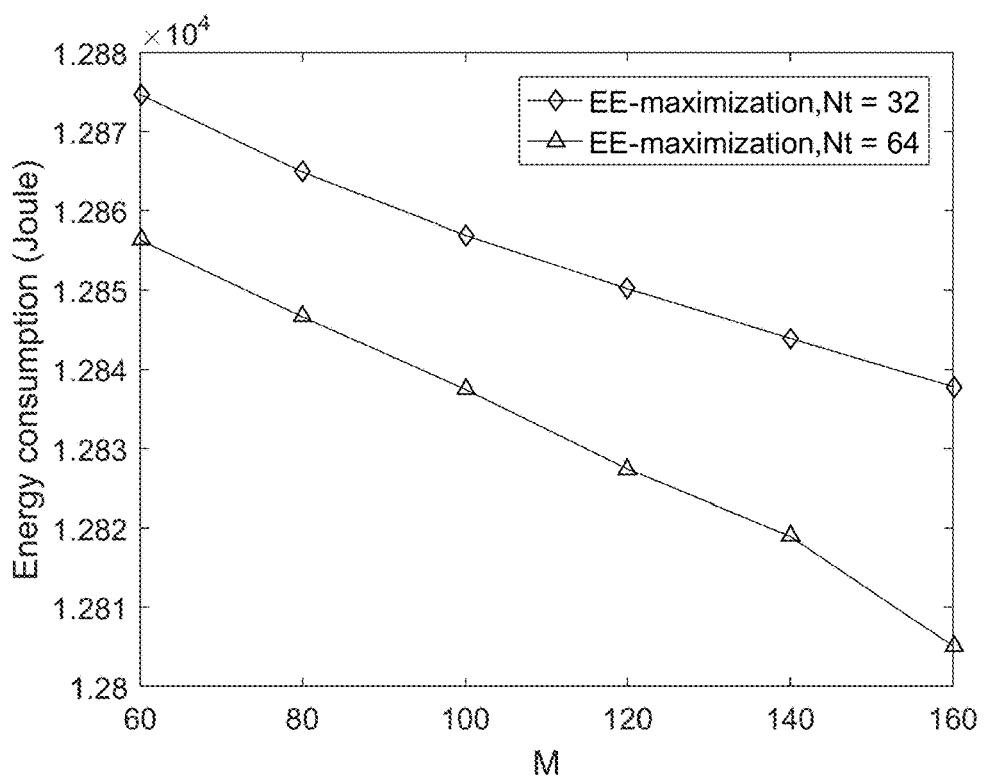
FIG. 6(c) is a partial enlarged view when number of elements on an intelligent reflecting surface is 60 to 160 under an optimization solution of maximizing energy efficiency as shown in FIG. 6(a), which are provided for the convenience of comparing the changes of energy consumption under the two optimization solution.

Next, FIG. 5 and FIG. 6(a) respectively analyze the influences of M and $N_t$ on the spectrum efficiency and the energy consumption under the two optimization solutions. It can be found that with the increase of M, the spectrum efficiency is increased and the energy consumption is decreased, but the influence on the energy consumption is very small and can be almost ignored. This is because the energy consumption is mostly used for the flight of the UAV, and the number of the reflecting elements on the intelligent reflecting surface and the number of the base station antennas have very little influence on UAV trajectory optimization, so the change of the energy consumption is also small. It can also be seen from FIG. 5 that although the spectrum efficiency of solution 1 is lower than that of solution 2, the spectrum efficiency can be compensated by increasing the number of the base station antennas. In addition, FIG. 6(a) shows that the energy consumption of solution 1 is far lower than that of solution 2. It can be found from FIG. 6(b) and FIG. 6(c) that increasing the number of the antennas has a certain positive effect on reducing the energy consumption, but the influence is very small.

Step 4, analyzing the change of the energy efficiency of the system with the flight time of the UAV.

Figure 7:
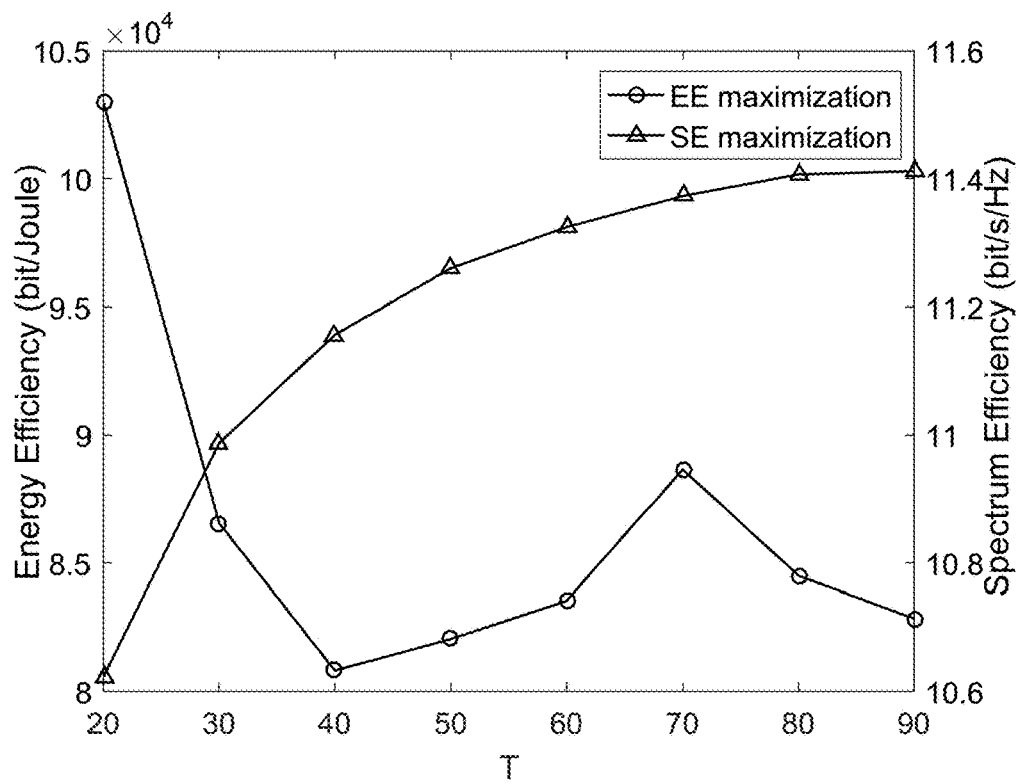
FIG. 7 shows influence of flight time on corresponding target values of different optimization solutions.
Figure 8:
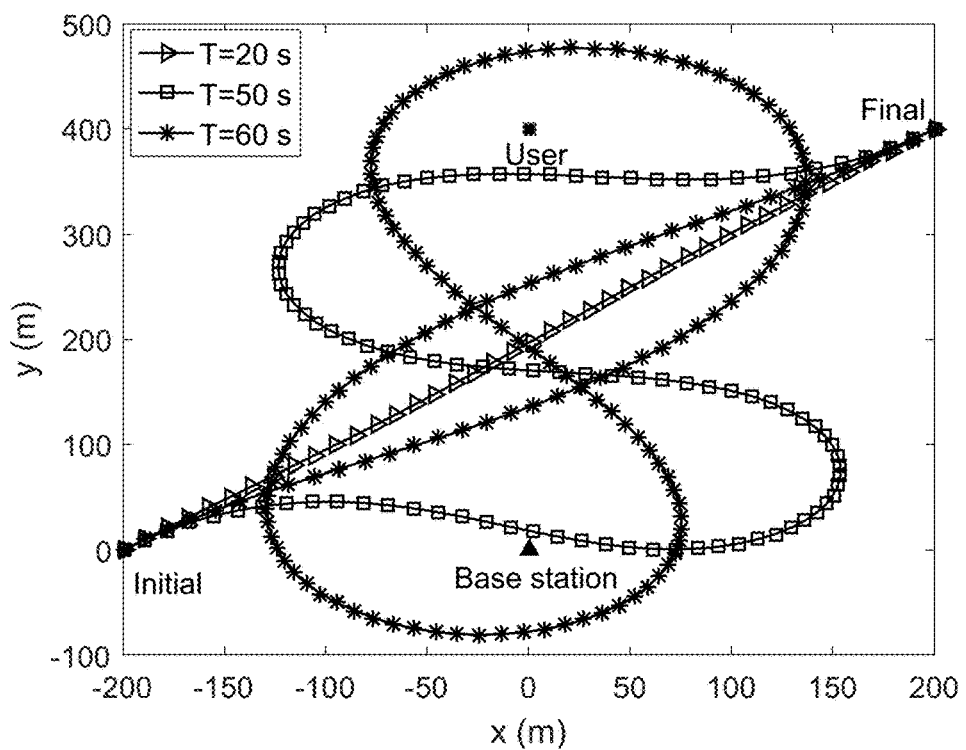
FIG. 8 shows flight trajectories of a UAV under maximum energy efficiency with different flight times.

FIG. 7 shows the change of the energy efficiency with the flight time of the UAV, and also shows the change of the spectrum efficiency with time for comparative analysis. The spectrum efficiency is increased with the increase of T, because as the flight time is increased, the UAV will spend more time hovering near an optimal point, and the average achievable rate (i.e., the spectrum efficiency) is increased. Whereas the energy efficiency as a whole shows a downward trend with the increase of time, and is increased in some time regions. FIG. 8 shows the optimized trajectory of the solution of maximizing energy efficiency with different T; when T=20 s, the flight trajectory of the UAV is close to a straight line, and less energy is consumed; when T=50 s, the UAV flies in an S-shaped trajectory; when T=60 s, the UAV flies in a 8-shaped trajectory; the energy consumed during the flight of the UAV is increased with the increase of the flight time; however, as the flight trajectory is so long and the increase in transmission information is limited, the energy efficiency will be decreased. In addition, the general shape of the flight trajectory of the UAV will change significantly at some points with the increase of time, which is also the reason why energy efficiency has an upward trend with the increase of time.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A design method of a high energy efficiency Unmanned Aerial Vehicle (UAV) communication system assisted by an intelligent reflecting surface, comprising the following steps:

step 1, constructing a system model:

(1) information transmission between a base station and a ground user is realized, wherein the base station comprises multiple antennas, and the user comprises a single antenna; in a three-dimensional coordinate system, horizontal coordinates of the fixed base station and the user are respectively $q_B=[x_B,y_B]$ and $q_G=[x_G,y_G]$, and an height of base station antennas is set as $z_B$;

(2) it is assumed that a UAV flies at a fixed height h with a flight time of T which is discretized into N time slots with a time slot length of $\delta_t=T/N$, then the horizontal coordinate of the UAV in the $n^{th}$ time slot is $q[n]=[x[n],y[n]]^T$, $n\in N=\{0,\ldots,N\}$, and the UAV flies from an initial position $q_0$ to a final position $q_F$, i.e., $q[0]=q_0$, $q[N]=q_F$;

(3) it is assumed that a channel between the base station and the user is blocked and a serious fading exists, which conforms to Rayleigh fading, then a channel gain from the base station to the user is:

$$h_{BG}=\sqrt{\rho d_{BG}^{-\kappa}}\tilde{h}\in \mathbb{C}^{1\times N_t}, \quad (1)$$

where $\rho$ is a channel gain at a unit reference distance, $d_{BG}=\sqrt{z_B^2+\|q_B-q_G\|^2}$ is a distance between the base station and the ground user, $\kappa$ is a path loss index, $\tilde{h}\sim CN(0,1)$ is a channel gain of a Rayleigh channel, and $N_t$ is the number of antennas on the base station;

a channel gain from the base station to an intelligent reflecting surface is expressed as:

$$h_{BI}[n]=\sqrt{\rho d_{BI}^{-2}[n]}h_M^T(\alpha[n])h_{N_t}(\beta[n])\in \mathbb{C}^{M\times N_t}, \quad (2)$$

where $d_{BI}[n]=\sqrt{(z_I-z_B)+\|q[n]-q_B\|^2}$ represents a distance between the base station and the intelligent reflecting surface, $h_M^T$ is a transposition matrix of $h_M$, M reflecting elements on the intelligent reflecting surface are arranged in the form of a uniform linear array ULA, position coordinates of the first reflecting element are used to determine a reference point, then array responses of the intelligent reflecting surface and the base station are expressed as $$h_M^T(\alpha[n]) = \left(1, e^{-j\frac{2\pi}{\lambda}d\alpha[n]}, \ldots, e^{-j\frac{2\pi}{\lambda}d(M-1)\alpha[n]}\right)^T$$

and $$h_{N_t}(\beta[n]) = \left(1, e^{-j\frac{2\pi}{\lambda}d\beta[n]}, \ldots, e^{-j\frac{2\pi}{\lambda}d(N_t-1)\beta[n]}\right),$$

where j represents an imaginary part, d is a horizontal distance between different reflecting elements, $\lambda$ is a wavelength of a carrier, $$\alpha[n] = \frac{y_I - y_B}{d_{BI}[n]}$$

is the cosine of arrival angle of a signal from the base station to the intelligent reflecting surface, and $$\beta[n] = \frac{z_I - z_B}{d_{BI}[n]}$$

is the cosine of departure angle of the signal from the base station to the intelligent reflecting surface, where $y_I$ and $y_B$ are respectively y-axis coordinates corresponding to the intelligent reflecting surface and the base station in the three-dimensional coordinate system, and $z_I$ is a height of the intelligent reflecting surface, which is the same as the flight height of the UAV in this study;

a channel from the intelligent reflecting surface to the ground user is also a Line of Sight (LoS) link, and a gain thereof is expressed as:

$$h_{IG}[n] = \sqrt{\rho d_{IG}^{-2}[n]}\left(1, e^{-j\frac{2\pi}{\lambda}d\phi[n]}, \ldots, e^{-j\frac{2\pi}{\lambda}d(M-1)\phi[n]}\right)^T \in \mathbb{C}^{M\times 1}, \quad (3)$$

where $d_{IG}[n]=\sqrt{z_I^2+\|q[n]-q_G\|^2}$ represents a distance between the intelligent reflecting surface and the user, and $$\phi[n] = \frac{y_G - y_I}{d_{IG}[n]}$$

is the cosine of departure angle of the signal reflected from the intelligent reflecting surface to the user, where $y_G$ and $y_I$ are respectively y-axis coordinates corresponding to the user and the intelligent reflecting surface in the three-dimensional coordinate system;

phase shift adjustment of the signal on the intelligent reflecting surface can be expressed as $\Theta[n]=\text{diag}(e^{j\Theta_1[n]}, e^{j\Theta_2[n]}, \ldots, e^{j\Theta_M[n]})$, where diag represents a diagonal matrix, $\theta_M[n]$ is a phase shift value of the $M^{th}$ reflecting element in the $n^{th}$ time slot, and $\theta \in [0, 2\pi]$ assuming that the phase can be continuously controlled and adjusted;

(4) a Signal-Noise-Ratio (SNR) of the system is a function of a beamforming w of the base station, a phase shift matrix $\Theta$ of the intelligent reflecting surface, and a flight trajectory $Q \triangleq \{q[n], n \in \mathcal{N}\}$ of the UAV; and an average achievable rate is expressed as:

$$\bar{R}(\{w\}, \{\Theta\}, \{Q\}) = \frac{1}{N}\sum_{n=1}^{N}\log_2(1+SNR[n]) = \qquad (4)$$

$$\frac{1}{N}\sum_{n=1}^{N}\log_2\left(1+\frac{P|h_{BG}+h_{IG}^H[n]\Theta[n]h_{BI}[n])w[n]|^2}{\sigma^2}\right).$$

where SNR [n] is the SNR in the $n^{th}$ time slot, $\delta^2$ is a noise power, P is a transmitting power of the base station, and w[n] represents the beamforming of the base station in the $n^{th}$ time slot; during the flight time T of the UAV, the total amount of data transmitted by the system is $R^{total}(\{w\}, \{\Theta\}, \{Q\}) = WN\delta_t \bar{R}$, where W is the bandwidth of the system;

a propulsion power of the UAV is related to a flight velocity, an acceleration and a design of the UAV as well as air density, and energy consumed by the UAV during the flight time is expressed as:

$$E^{total}(\{v\},\{a\}) = \qquad [5]$$

$$\delta_t \sum_{n=1}^{N}\left[c_1\|v[n]\|^3 + \frac{c_2}{\|v[n]\|}\left(1+\frac{\|a[n]\|^2-\frac{(a^T[n]v[n])^2}{\|v[n]\|^2}}{g^2}\right)\right]+$$

$$\frac{1}{2}m(\|v[N]\|^2-\|v[0]\|^2).$$

where $c_1$ and $c_2$ are two parameters, which are related to the design of the UAV and the air density, g is the gravitational acceleration, v[n] and a[n] are respectively the velocity and the acceleration of the UAV in the $n^{th}$ time slot, and m is the weight of the UAV and the intelligent reflecting surface;

energy efficiency refers to amount of information transmitted per unit energy consumption; according to the definition thereof, the energy efficiency of the system is expressed as:

$$EE(\{w\},\{\Theta\},\{Q\},\{v\},\{a\}) = \frac{R^{total}(\{w\},\{\Theta\},\{Q\})}{E^{total}(\{v\},\{a\})}. \qquad (6)$$

step 2, determining an objective function and optimization variables, and listing an optimization problem:
through joint optimization of an active beamforming w of the base station, a passive beamforming $\Theta$ of the intelligent reflecting surface and the trajectory Q of the UAV, the energy efficiency of the system is maximized, and the following optimization problem is constructed:

$$(P1): \max_{w,\Theta,Q,v,a} EE(\{w\},\{\Theta\},\{Q\},\{v\},\{a\}) = \frac{R^{total}(\{w\},\{\Theta\},\{Q\})}{E^{total}(\{v\},\{a\})} \qquad [7]$$

s.t. $C1: v[0]=v_0, v[N]=v_F,$ $C3: v[n]=v[n-1]+a[n]\delta_t, n \in N,$ $C4: \|v[n]\| \le v_{max}, n \in N,$ $C5: \|v[n]\| \ge v_{min}, n \in N,$ $C6: \|a[n]\| \le a_{max}, n \in N,$ $C7: q[n]=q[n-1]+v[n]\delta_t+\frac{1}{2}a[n]\delta_t^2, n \in N,$ $C8: q[N]=q_F,$ $C9: q[0]=q_0.$ in this optimization problem, C1-C6 are constraints on the velocity and the acceleration of the UAV, where $v_0$ and $v_F$ are respectively an initial velocity and a terminal velocity, and $v_{max}$, $v_{min}$ and $a_{max}$ are respectively the maximum flight velocity, the minimum flight velocity and the maximum flight acceleration of a fixed-wing UAV; and C7 and C8 are constraints on the trajectory of the UAV;

step 3, designing an algorithm to solve the optimization problem:
an idea of block iteration is used to decompose the above optimization problem into three sub-problems, a closed-form expression of optimal solutions for the beamformings of the base station and the intelligent reflecting surface is obtained, and the trajectory of the UAV is optimized; firstly, a successive convex approximation method is used to transform a non-convex problem into a convex optimization problem, then a Dinkelbach algorithm is used to solve a fractional program problem, and an iterative algorithm is designed to obtain a suboptimal solution thereof; and the specific steps are as follows:

(1) optimization of the active beamforming w of the base station the signal emitted from the base station is divided into two parts: one part is directly transmitted to the ground and the other part is transmitted to the intelligent reflecting surface; when the beamforming $\Theta$ of the intelligent reflecting surface and the trajectory Q of the UAV are determined, the energy consumed is also determined, and the numerator of the objective function is analyzed to maximize the achievable rate; a closed-form solution of an optimal beamforming of the base station when the other two variables $\Theta$ and Q are determined is obtained by maximum ratio transmission, i.e.:

$$w^*[n] = \frac{(h_{BG}+h_{IG}^H[n]\Theta[n]h_{BI}[n])^H}{\|h_{BG}+h_{IG}^H[n]\Theta[n]h_{BI}[n]\|}. \qquad (8)$$

(2) optimization of the passive beamforming $\Theta$ of the intelligent reflecting surface
the optimal beamforming w*[n] of the base station is substituted into the objective function, and the numerator of the objective function is simplified as:

$$R^{total'}(\{\Theta\}, \{Q\}) = \qquad (9)$$

$$W\delta_t \bar{R}_1 = \frac{1}{N}\sum_{n=1}^{N}\log_2\left(1 + \frac{P}{\sigma^2}\left\|h_{BG} + h_{IG}^H[n]\Theta[n]h_{BI}[n]\right\|^2\right).$$

when the trajectory Q of the UAV is determined, an optimal $\Theta$ is obtained by analyzing formula (9); an optimal passive beamforming of the intelligent reflecting surface is finally expressed as:

$$\Theta^*[n] = \text{diag}(e^{j\theta_1^*[n]}, e^{j\theta_2^*[n]}, \ldots, e^{j\theta_M^*[n]}). \qquad (17)$$

(3) optimization of the trajectory Q of the UAV the optimal passive beamforming $\Theta$ of the intelligent reflecting surface is substituted into the objective function, and the objective function is simplified as:

$$(18)$$

$$EE'(\{Q\}, \{v\}, \{a\}) =$$

$$\frac{W\sum_{n=1}^{N}\log_2\left[1 + \frac{P}{\sigma^2}\left(C + \frac{A}{d_{IG}[n]d_{BI}[n]} + \frac{B}{d_{IG}^2[n]d_{BI}^2[n]}\right)\right]}{\sum_{n=1}^{N}\left[c_1\|v[n]\|^3 + \frac{c_2}{\|v[n]\|}\left(1 + \frac{\|a[n]\|^2 - \frac{(a^T[n]v[n])^2}{\|v[n]\|^2}}{g^2}\right)\right] + \frac{1}{2}m(\|v[N]\|^2 - \|v[0]\|^2)},$$

where $$A = 2\rho^{\frac{3}{2}}d_{BG}^{-\frac{K}{2}}M\left|h_{N_t}[n](\alpha[n])\tilde{h}^H\right|,$$

$$B = \rho^2 N_t M^2,$$

and $$C = \rho d_{BG}^{-\kappa}\tilde{h}\tilde{h}^H; \qquad (40)$$

it is assumed that the initial velocity and the final velocity of the UAV are the same, i.e., $\|v[0]\| = \|v[N]\|$, then in the expression of energy consumption, the change of the second item kinetic energy is zero; and the upper bound of energy consumption can be expressed as:

$$E(\{v\}, \{a\}) \leq E_{ub}(\{v\}, \{a\}) = \sum_{n=1}^{N}\left[c_1\|v[n]\|^3 + \frac{c_2}{\|v[n]\|}\left(1 + \frac{\|a[n]\|^2}{g^2}\right)\right], \qquad (19)$$

when $a^T[n]v[n]=0$, the lower bound of energy efficiency can be expressed as:

$$(20)$$

$$EE'_{lb}(\{Q\}, \{v\}, \{a\}) =$$

$$\frac{W\sum_{n=1}^{N}\log_2\left[1 + \frac{P}{\sigma^2}\left(C + \frac{A}{d_{IG}[n]d_{BI}[n]} + \frac{B}{d_{IG}^2[n]d_{BI}^2[n]}\right)\right]}{\sum_{n=1}^{N}\left[c_1\|v[n]\|^3 + \frac{c_2}{\|v[n]\|}\left(1 + \frac{\|a[n]\|^2}{g^2}\right)\right]}.$$

as the objective function is a non-convex fractional program problem, auxiliary variables $\{r[n]=d_{IG}[n]\}$, $\{s[n]=d_{BI}[n]\}$ and $\{\tau_n = \|v[n]\|\}$ are introduced to transform the non-convex problem into concave-convex fractional program problems:

$$(P2):\max_{Q,v,a} \frac{W\sum_{n=1}^{N}\log_2\left[1 + \frac{P}{\sigma^2}\left(C + \frac{A}{r[n]s[n]} + \frac{B}{r^2[n]s^2[n]}\right)\right]}{\sum_{n=1}^{N}\left[c_1\|v[n]\|^3 + \frac{c_2}{\tau_n} + \frac{c_2\|a[n]\|^2}{\tau_n g^2}\right]} \qquad (21a)$$

s.t. $\tau_n \geq v_{min}, n \in N,$ (21b)

$\|v[n]\|^2 \geq \tau_n^2, n \in N,$ (21c)

$\|v_0(n)\|^2 + 2v_0^T[n](v[n] - v_0[n]) \geq \tau^2, n \in N,$ (21d)

$d_{IG}^2[n] + r_0^2[n] - 2r_0[n]r[n] \leq 0, n \in N,$ (21e)

$d_{BI}^2[n] + s_0^2[n] - 2s_0[n]s[n] \leq 0, n \in N,$ (21f)

C1-C4, C6-C9. (21g)

the Dinkelbach algorithm is used to introduce a parametric variable $\mu$, and convex optimization kit CVX is used to solve the following problems:

$$(P3):\max_{Q,v,a} W\sum_{n=1}^{N}\log_2\left[1 + \frac{P}{\sigma^2}\left(C + \frac{A}{r[n]s[n]} + \frac{B}{r^2[n]s^2[n]}\right)\right] - \qquad (22a)$$

$$\mu\sum_{n=1}^{N}\left[c_1\|v[n]\|^3 + \frac{c_2}{\tau_n} + \frac{c_2\|a[n]\|^2}{\tau_n g^2}\right]$$

s.t. (21b) – (21g). (22b)

(4) the optimization problem is solved by the iterative algorithm; in each round of iteration, the Dinkelbach algorithm is used to solve an optimal flight trajectory of the UAV in the current round of iteration, and then the optimal passive beamforming of the intelligent reflecting surface and active beamforming of the base station antennas are calculated, thus to solve the energy efficiency value of the iteration; finally, the value of the parametric variable is updated for a next iteration until the algorithm is converged at last; the specific process is as follows:

1) Setting initial beamforming $w_0$ of the base station, reflection phase $\Theta_0$ of the intelligent reflecting surface, flight trajectory $Q_0$ of the UAV, flight velocity $v_0$ of the UAV, and auxiliary variables $r_0$ and $s_0$; iteration number k=0; initial value $\mu_0=1$ of the parametric variable introduced by the Dinkelbach algorithm; and iteration termination threshold $\xi$;

2) solving the convex optimization problem (P3) to obtain optimization results of the $k^{th}$ iteration, i.e., flight trajectory $Q_{k+1}$ of the UAV, flight velocity $v_{k+1}$ of the UAV and auxiliary variables $r_{k+1}$ and $s_{k+1}$, which are used as the initial values of the $(k+1)^{th}$ iteration;

3) updating the value of the parametric variable $\mu_{k+1}$, which is the value of the objective function in problem (P2);

4) after the optimized trajectory $Q_{k+1}$ of the iteration is obtained, calculating an optimal reflection phase $\theta_{k+1}$ of the intelligent reflecting surface;

5) after $Q_{k+1}$ and $\Theta_{k+1}$ are obtained, using formula (8) to calculate the optimal beamforming $w_{k+1}$ of the base station corresponding to the iteration;
6) calculating an increment in a target value EE of problem (P2) after the iteration; if the increment is greater than the threshold, updating the number of iterations k=k+1, and skipping to step 2) for a next iteration optimization; if the increment of the target value of the optimization is less than the threshold, terminating the iteration, and outputting values of corresponding optimization variables.

* * * * *